Dec. 16, 1952     H. W. CARDWELL ET AL     2,621,769
FLEXIBLE PLATE CLUTCH OR BRAKE

Filed May 15, 1947     3 Sheets-Sheet 1

Inventors
Harland W. Cardwell
Earl R. Johnson
By
Bacon & Thomas
Attorneys

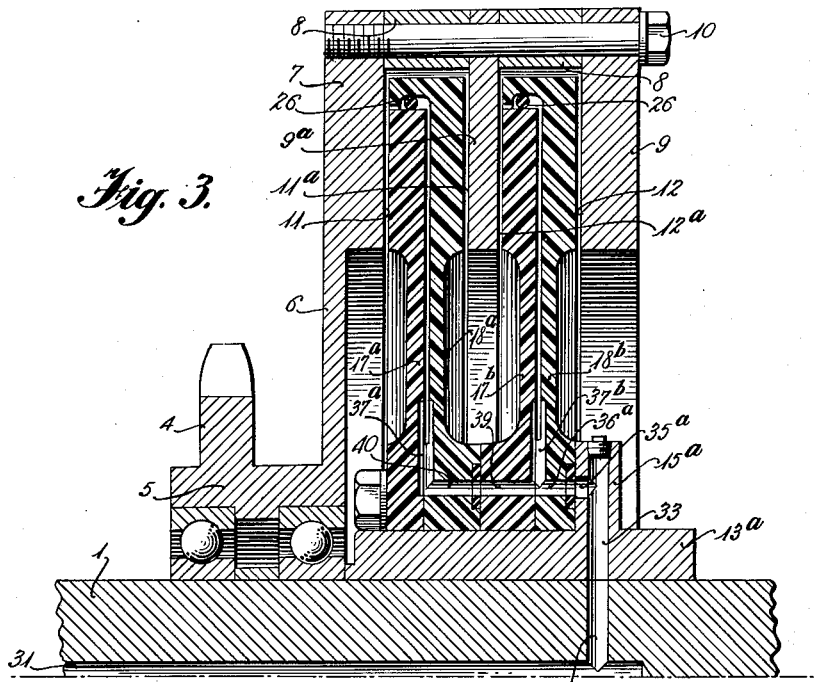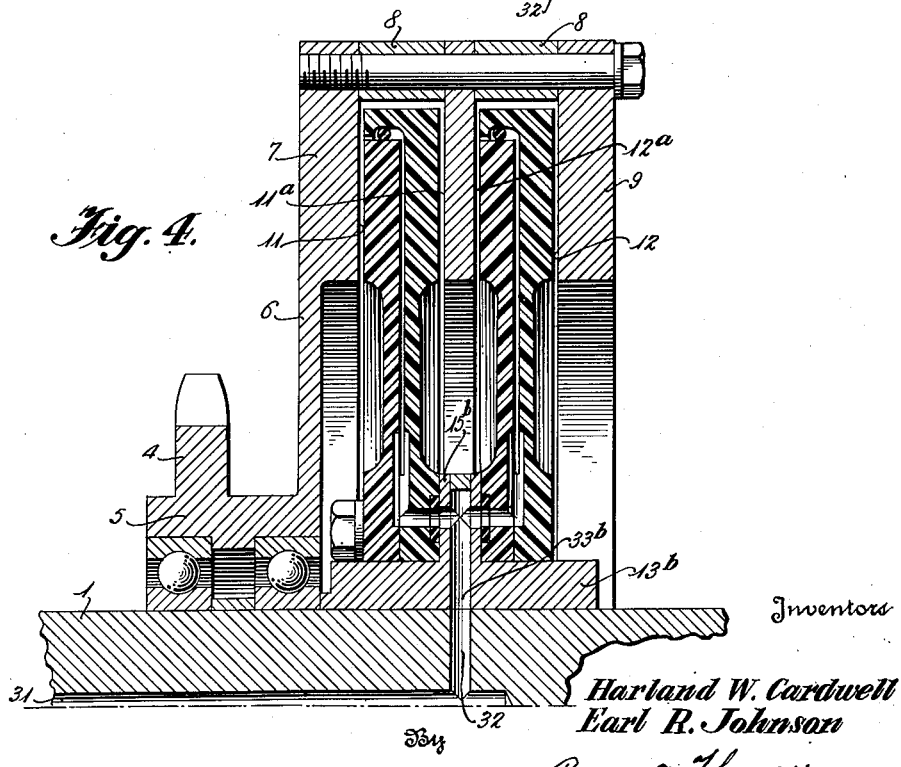

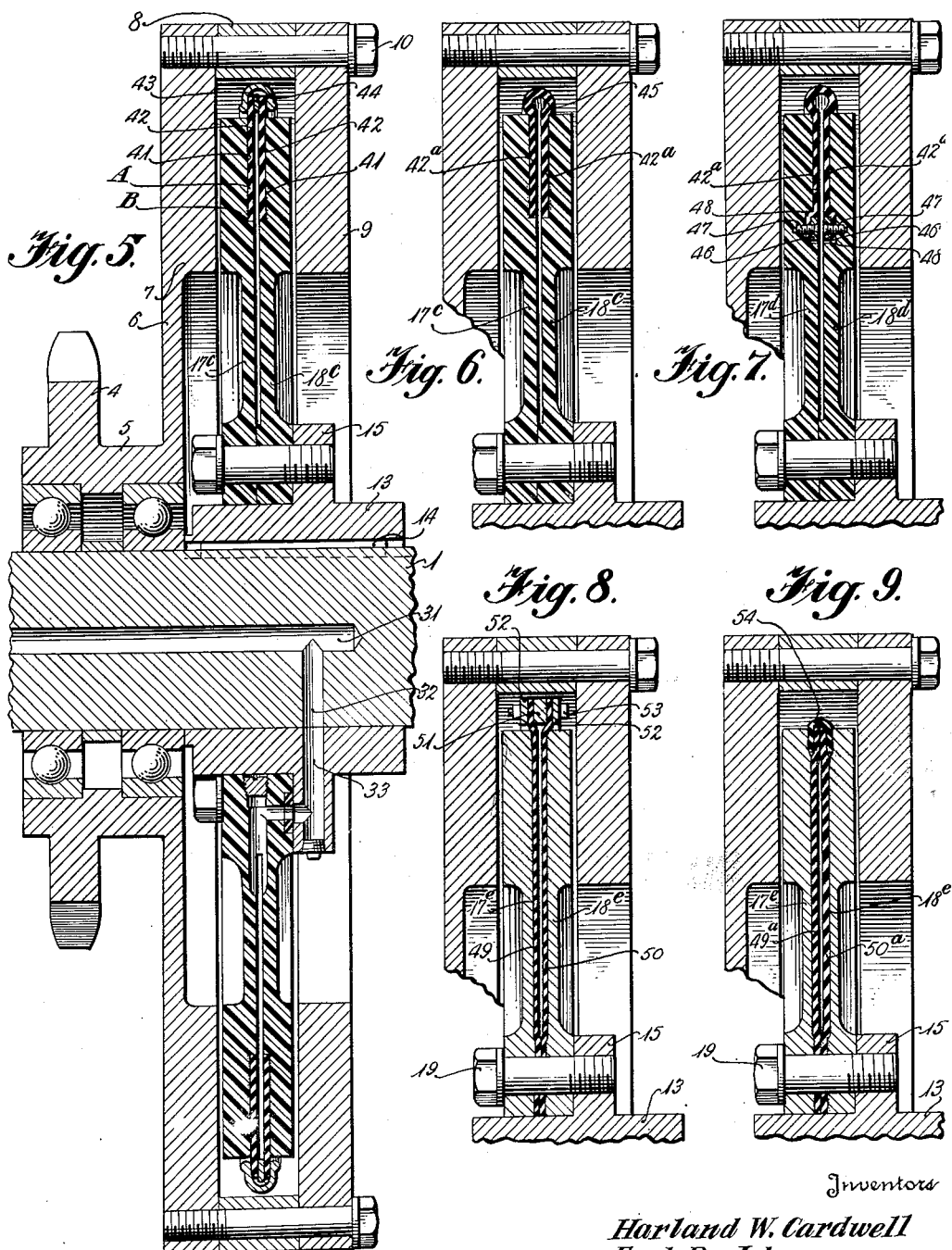

Patented Dec. 16, 1952

2,621,769

UNITED STATES PATENT OFFICE 2,621,769

FLEXIBLE PLATE CLUTCH OR BRAKE

Harland W. Cardwell and Earl R. Johnson, Wichita, Kans., assignors to Cardwell Manufacturing Company, Inc., Wichita, Kans.

Application May 15, 1947, Serial No. 748,230

17 Claims. (Cl. 192—88)

1

This invention relates to clutches and brakes and particularly friction clutches and brakes operated by fluid pressure.

It is an object of this invention to provide such a structure that is simple and rugged in construction, economical to manufacture and relatively trouble-free during its useful life.

This object is attained in the embodiments illustrated in the accompanying drawings, in which:

Fig. 3 is a longitudinal sectional view of a portion of a modification of the clutch of Fig. 1;

Fig. 4 is also a longitudinal sectional view of a portion of a modification of the clutch of Fig. 1;

Figs. 5, 6 and 7 are sectional views of modified forms of clutches embodying the present invention; and Figs. 8 and 9 are sectional views of portions of a still further modified form of clutch.

Throughout the drawings, parts bearing like reference characters in the different embodiments are identical in construction with parts similarly identified in the other modifications.

Figure 1:
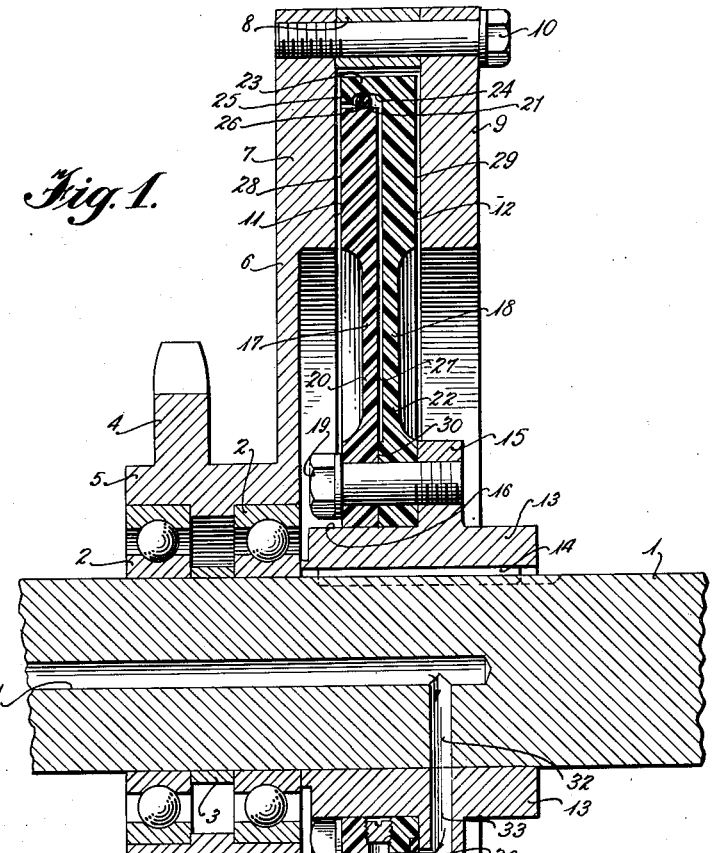
Fig. 1 is a longitudinal sectional view of one form of clutch embodying the present invention.
Figure 2:
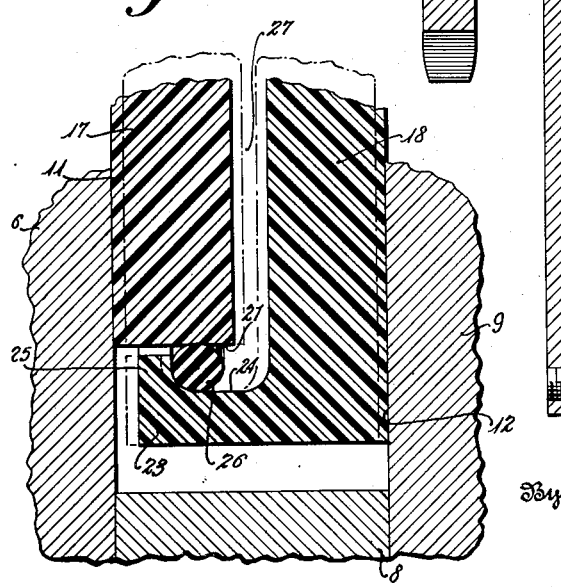
Fig. 2 is a fragmentary sectional view on an enlarged scale of parts of Fig. 1 showing the parts thereof in different positions.

In the form of clutch illustrated in Figs. 1 and 2, a shaft 1 is supported for rotation by suitable bearings (not shown) and drives the mechanism to which power is to be transmitted. A pair of anti-friction bearings 2 is held in spaced relationship by a collar 3 and rotatably supports a driving sprocket 4 on the shaft 1. The sprocket 4 may be suitably driven by any conventional source of power. The hub portion 5 of the sprocket 4 has formed thereon a radially outwardly extending plate 6 having an annular thickened portion 7 adjacent its outer periphery. A spacer ring 8 is positioned adjacent the outer periphery of the plate 6 and engages one face thereof. An annular ring 9, equal in radial extent to the thickened portion 7 of the plate 6, is arranged against the spacer ring 8, and the ring 8, the ring 9, and the plate 6 are held in rigid assembled relation by such means as cap screws 10. It will be noted that the assembly just described provides a driven member having a pair of opposed annular surfaces 11 and 12 defining an inwardly facing annular groove of uniform width in the driving member.

A hub member 13 is keyed to the shaft 1, as at 14, and is provided with an outwardly extend-

2 ing annular flange 15 and a cylindrical portion 16. A pair of plates 17 and 18 are supported by the cylindrical portion 16 of the hub member 13 and are clamped to each other and to the annular flange 15 by means of a circumferential series of cap screws 19. The plate 17 is provided with an annular portion 20 of reduced thickness extending from a position adjacent the hub 13 to a position adjacent the inner edge of the thickened portion of the plate 6. The remainder of the plate 17 is relatively thick, as shown in Fig. 1, and has a cylindrical outer peripheral surface 21. The plate 18 is likewise provided with a relatively thin annular portion 22 and a relatively thick outer portion, which outer portion terminates in a cylindrical flange 23 that extends over the cylindrical surface 21 of the plate 17. The flange 23 of the plate 18 presents a cylindrical surface 24 facing the cylindrical surface 21 of the plate 17 and has a radially inwardly extending portion 25 that terminates short of the cylindrical surface 21 of the plate 17. Thus, the outer peripheral portions of the plates 17 and 18 are free to move independently of each other, inasmuch as there is no mechanical interconnection therebetween which would hinder such movement. A torus or O-ring 26 of deformable material, such as rubber or the like, is positioned between the cylindrical surfaces 21 and 24 and is of such dimension that when so positioned, it is slightly compressed into a generally oval shape between said surfaces. The inwardly projecting portion 25 of the flange 23 constitutes a stop member to prevent accidental removal of the torus 26 from its position between the surfaces 21 and 24 and against which the torus may abut to effect a proper seal when the clutch is actuated. The plate member 18 is further provided with an annular recess 27 in its face adjacent the plate 17. Thus, when the plates 17 and 18 are assembled on the hub member 13, the recess 27 provides a space between adjacent faces of the plates 17 and 18. This space with the compressed torus 26 acting as a fluid pressure seal constitutes an expansible pressure chamber whereby upon the admission of fluid under pressure to the recess 27 the plates 17 and 18 will be urged away from each other and their outer faces 28 and 29 will be forced into frictional engagement with the faces 11 and 12, respectively, of the driving member and as long as the pressure is maintained within the space between the plates 17 and 18, a frictional driving engagement between the driving member and driven member will be maintained. The relatively thin portions 20 and 22 of the plates 17 and 18, respectively, provide the necessary resilience or flexibility to permit the outer thickened portions of said plates to move axially into frictional engagement with the surfaces 11 and 12 without movement being imparted to the portions of the plates that are clamped to the flange 15. The plate 6 and the annular ring 9 are preferably constructed of metal, such as steel, and the plates 17 and 18 may be constructed of a molded plastic material or, if desired, the plates 17 and 18 may be constructed of metal with the faces 28 and 29 covered by a suitable friction material. If the plates 17 and 18 are constructed of a moldable plastic material, they are preferably cemented together at the surface 30 adjacent the hub member 13, to provide at that point an effective seal against the escape of fluid pressure. If said plates are constructed of metal, it is preferred that a gasket be provided between the plates at the hub portion to thus effect a suitable fluid pressure seal. If the plate members 17 and 18 are made from sheet stock material having parallel sides, it will be apparent that upon introduction of fluid under pressure to the space between said plates and movement of the surfaces 28 and 29 into contact with the surfaces 11 and 12 that the outermost portions of said plates will make such contact first, and the driving engagement will be limited to a relatively small portion of said surfaces. The surfaces 28 and 29, however, may be properly machined to effect driving engagement of the surfaces 11 and 12 throughout their entire radial extent or the clutch may be operated without such machining until the parts wear sufficiently to effect the proper engagement between the surfaces.

As shown in the lower portion of Fig. 1, the shaft 1 is provided with an axial passageway 31 and a radial passageway 32 communicating therewith and extending radially outwardly into communication with a radial passageway 33 in the hub member 13. The passageway 33 extends outwardly through the flange 15 and is provided at its outer end with a sealing plug 34. The flange 15 is further provided with a lateral bore 35. This lateral bore 35 is aligned with a lateral bore 36 in the plate 18, as shown. A bore 37 communicates with the lateral bore 36 and extends radially outwardly into communication with the space provided between the plates by the recess 27 described above. A gasket or ring 28 of rubber or the like surrounds the lateral bore 36 and is positioned in a recess in the hub portion of the plate 18 to effect a proper fluid seal between the plate 18 and the flange 15 around the bores 35 and 36. A suitable fitting (not shown) is provided on the end of the shaft 1 in communication with the axial passageway 31 whereby fluid under pressure may be admitted into said passageway. Such fluid under pressure will be conducted through the passageways 31 and 32 and the bores 33, 35, 36 and 37 into the space between the plates 17 and 18. Such pressure will act to urge said plates apart by flexure of the portions 20 and 22, thus forcing and maintaining the surfaces 28 and 29 in frictional engagement with the surfaces 11 and 12.

Fig. 2 illustrates in greater detail the action of the torus or O-ring 26 during axial movement of the outer edge portions of the plates 17 and 18. As shown in full lines in Fig. 2, the outer or thickened portions of the plates 17 and 18 are in frictional engagement with the surfaces 11 and 12 and are being pressed thereagainst by the pressure of the fluid between the plates. As shown in dotted lines in Fig. 2, the plates 17 and 18 are in the positions they will assume when the fluid pressure is released from the space 27 between the plates. During movement of the plates 17 and 18 toward and from each other, the torus 26 will maintain substantially the same axial position but will roll on the two surfaces 21 and 24 while being held in a compressed condition since surfaces 21 and 24 move substantially equal amounts in opposite directions, thus effecting a proper fluid pressure seal and not being subject to abrasion during relative axial movement of the surfaces 21 and 24. In assembing the device, the torus 26 is placed in the space provided without regard for its proper positioning therein and when the clutch is actuated the first time, the pressure of the fluid will force the plates 17 and 18 to the position shown in full lines in Fig. 2 and, if necessary, the torus 26 will be forced by that pressure against the inwardly extending stop 25. Some sliding of the torus 26 on the surface 21 or 24 or both may take place during the first time the clutch is actuated to position said torus against the stop 25. Upon release of the pressure, however, the plates 17 and 18, due to their natural resilience, will return to the dotted line position, and during this movement only rolling contact between the torus 26 and the surfaces 21 and 24 will be experienced, and upon subsequent actuation of the clutch, the surfaces 21 and 24 and the torus 26 will roll to the position shown in full line in Fig. 2. Thus, no abrasion of the material of the torus 26 will take place.

The modification illustrated in Fig. 3 comprises a clutch wherein two pairs of plates 17a and 18a and 17b and 18b are provided. In this modification, the driven member is provided with two inwardly extending annular rings 9 and 9a, thus providing four frictional surfaces 11, 11a, 12 and 12a on the driving member to be engaged by the four surfaces of the driven member. In this modification, the two pairs of plates 17a—18a and 17b—18b are clamped to the same side of the flange 15a of the hub member 13a. The bore 35a in the flange 15a communicates with aligned bores 36a, 39 and 40 in the hub portions of the plates 18a, 17b and 18b. Radially extending bores 37a and 37b communicate with the bores 36a, 39 and 40, and the spaces between the two pairs of plates thus providing means to simultaneously conduct fluid under pressure into the spaces between both pairs of plates whereby they may be simultaneously actuated. This form of clutch operates in a manner identical to that of the clutch in Fig. 1, but is capable of transmitting greater amounts of power. All other features of the modification of Fig. 3 are identical to similar features as described in connection with Fig. 1.

In the modified embodiment illustrated in Fig. 4, a clutch of capacity similar to that of Fig. 3 is provided, the only difference being that the two pairs of flexible plates are mounted on the hub member 13b on opposite sides of the flange 15b. The difference in construction of the bores for conducting fluid under pressure into the spaces between the plates will be obvious from an inspection of Fig. 4 and need not be further described.

Fig. 5 illustrates a further modification of clutch embodying the principles of the present invention. The construction of this clutch is the same as that described in connection with Fig. 1, except for the means effecting a pressure-tight seal between the outer portions of the flexible plates 17c and 18c. In this form of construction, the flange portion 23 of Fig. 1 is omitted, and the outer peripheral portions of the plates 17c and 18c are identical, each being provided with an annular recess 41, each recess being of a depth substantially equal to the thickness of the annular flexible diaphragms 42 placed therein. The annular diaphragms 42 are cemented or secured by other suitable adhesives to the plates 17c and 18c, respectively, along a radial portion extending from the point marked A to the radially inward edge B thereof. The cemented portions thus described extend annularly around the shaft 1, thus providing a fluid-tight seal between the inner portions of the diaphragms 42 and the plates 17c and 18c.

As is clear from Fig. 5, the diaphragms 42 extend radially outwardly slightly beyond the outer peripheral edges of the plates 17c and 18c. A spacing ring 43, which may be of metal, plastic, rubber or any other suitable material, is placed between the outer peripheral portions of the diaphragms 42 and said outer peripheral portions are clamped to said spacing ring by means of a crimped metal member 44, thus providing a fluid pressure seal at the outer peripheral edges of the diaphragms 42. The means for conducting fluid under pressure into the space between the plates 17c and 18c are identical to those described in connection with Fig. 1 and need not be further described here. Upon admission of fluid under pressure into said space, the plates 17c and 18c will flex outwardly into driving engagement with the driving member while the diaphragms 42 will provide the necessary seal to prevent escape of the fluid under pressure, in a manner that will be obvious, without hindering independent flexing movement of said plates.

In the modification of Fig. 6, all parts are identical to those described in connection with Fig. 5, with the exception of the means for sealing the outer peripheral edges of the diaphragms 42a. As shown in Fig. 6, the outer peripheral portions of the diaphragms 42a are joined by an integral portion 45 and during flexure of the plates 17c and 18c the integral portion 45 will allow independent relative movement between the outer portions of said plates while maintaining the space between said plates sealed against escape of fluid under pressure.

Fig. 7 illustrates a still further modification, similar to that of Fig. 6, but in which the inner peripheral portions of the diaphragms 42a are held in sealing engagement with the plates 17d and 18d by means of clamping rings 46 and screws 47 in recesses 48, as will be obvious from an inspection of Fig. 7. In this form of sealing means, the inner peripheral edges of the diaphragms are rigidly and positively clamped to their respective plates and no reliance is placed on the adhesive employed in the embodiments of Figs. 5 and 6.

Figs. 8 and 9 illustrate modifications of a still further embodiment of the invention. In the form illustrated in these figures, the diaphragms 49—50 and 49a—50a extend from the hub portion 13 to and slightly beyond the outer peripheral portions of the flexible plates 17e and 18e. The inner portions of said diaphragms extend between the innermost portions of the plates 17e and 18e and are clamped therebetween by the cap screws 19 that hold said plates in assembled relation to the flange 15 and hub 13, thus providing a fluid-tight seal between the inner portions of said diaphragms. In Fig. 8, the outer portions of said diaphragms are sealed against escape of fluid pressure by means of a spacer ring 51, clamping rings 52 and bolts 53. The bolts 53 clamp the outer peripheral portions of the diaphragms against the spacer ring 51 and thus effect a fluid-tight seal.

In Fig. 9, a separate piece 54, U-shaped in section, of a material similar to that of the diaphragms 49a and 50a, is cemented, vulcanized, or otherwise attached to the outer surfaces of the peripheral portions of said diaphragms and thus provide the outer peripheral seal.

In both of the embodiments shown in Figs. 8 and 9, the inner portions of the diaphragms may be cemented where they are clamped together to further insure an effective seal. The means for conducting fluid under pressure into the space between the diaphragms may be identical to that described in connection with Fig. 1, and it will be seen that in the last-described modifications, the diaphragms 49—50 and 49a—50a provide in effect an expansible pressure chamber between the flexible plates to force said plates into driving engagement with the driving member.

In each of the modifications of Figs. 5, 6, 7, 8, and 9, the diaphragms described are preferably constructed of molded rubber, but it is to be understood that any other suitable material having the requisite flexibility and being impervious to air under pressure may be employed with equal facility.

In all of the embodiments of the clutch described herein, the preferred motivating fluid is compressed air. However, it is not necessary that air specifically be employed, since any other fluid medium capable of transmitting pressure may be employed satisfactorily.

In all of the embodiments illustrated and described, the driving member has been shown as being rotatably mounted upon the shaft carrying the driven member. However, we do not wish to be limited to such construction since the invention may be practiced by mounting the driving and driven members on separate aligned shafts or by rotatably mounting the driven member on the supporting shaft 1 and keying the driving member to said shaft. Also, it is contemplated that other forms of driving means other than the sprocket shown may be employed.

While Figs. 3 and 4 illustrate a clutch having two pairs of flexible plates, it is clear that a greater number may be employed within the scope of this invention, the number of such pairs of plates employed being dictated by the amount of power desired to be transmitted.

Whereas the above description has been confined to a clutch having two rotatable elements, it will be apparent to those skilled in the art that the structures described can with equal facility be incorporated in a brake by arranging one of the coaxial elements on a stationary support whereby actuation of the fluid pressure responsive means will act to retard the rotation of the other member.

While a limited number of embodiments of the invention have been disclosed herein, it is contemplated that the invention not be strictly limited thereby, but that it include all modifications falling within the scope of the appended claims.

We claim:

1. A clutch comprising a driving member and a driven member, one of said members including means providing a pair of spaced opposed surfaces, the other of said members including a pair of substantially parallel flexible plates extending between said opposed surfaces and being spaced apart at least in the region of said opposed surfaces, the edges of said plates between said opposed surfaces being free from positive connection to each other so that said plates can move independently toward and away from each other and toward and away from said opposed surfaces and provided with deformable means therebetween to seal the space between said plates against escape of fluid pressure, and means for introducing fluid under pressure into said space.

2. A clutch comprising a driving member and a driven member, one of said members including means providing a pair of spaced opposed, substantially parallel surfaces, the other of said members including a pair of substantially parallel flexible plates terminating in edges between said opposed surfaces and being spaced apart at least in the region of said opposed surfaces, the edges of said plates between said opposed surfaces being free from positive connection to each other so that said plates can move independently toward and away from each other and into and out of engagement with said opposed surfaces and provided with deformable rubber sealing means extending therebetween to seal the space between said plates against escape of fluid pressure, and means for introducing fluid under pressure into said space.

3. A clutch comprising a driving member and a driven member, one of said members including means providing a pair of spaced opposed surfaces, the other of said members including a pair of substantially parallel plates having outer marginal edges free from positive connection to each other and extending between said opposed surfaces and having portions thereof spaced apart at least in the region of said opposed surfaces, each of said plates having a portion of reduced thickness whereby said plates can be moved independently with respect to each other and may flex into contact with one of said opposed surfaces, deformable sealing means extending between said plates to seal the space therebetween against escape of fluid pressure, and means for introducing fluid under pressure into said space.

4. A clutch comprising a driving member and a driven member, one of said members including means providing a pair of spaced opposed surfaces, the other of said members including a pair of substantially parallel plates having friction faces adjacent edges free from positive connection to each other and positioned between said opposed surfaces, said plates having portions thereof spaced apart at least in the region of said opposed surfaces, each of said plates having a portion of reduced thickness whereby its said friction face may flex into contact with one of said opposed surfaces, deformable sealing means extending between said plates and confined between said friction faces to seal the space therebetween against escape of fluid pressure, said plates being independently movable relative to each other, and means for introducing fluid under pressure into said space.

5. A clutch comprising coaxially rotatable driving and driven members, one of said members including means providing axially spaced and opposed surfaces, the other of said members including a pair of radially extending plates having edge portions free from positive connection to each other and disposed between said opposed surfaces and having portions thereof spaced apart at least in the region of said opposed surfaces, portions of said plates being flexible whereby said free edge portions may be independently axially moved into engagement with said opposed surfaces, deformable means between said plates adjacent said edge portions to seal the space between said plates against the escape of fluid pressure, and means for introducing fluid under pressure into said space.

6. A clutch comprising coaxially rotatable driving and driven members, one of said members including means providing axially spaced and opposed surfaces, the other of said members including a pair of radially extending plates having edge portions free from positive connection to each other and disposed between said opposed surfaces, portions of said plates being flexible, whereby said free edge portions may be axially moved into engagement with said opposed surfaces, said plates being provided with radially spaced axially extending opposed surfaces, deformable means substantially circular in axial section slightly compressed between said axially extending opposed surfaces to seal the space between said plates against the escape of fluid pressure, and means for introducing fluid under pressure into said space.

7. A clutch comprising coaxially rotatable driving and driven members, one of said members including means providing axially spaced and opposed surfaces, the other of said members including a pair of radially extending plates having thick peripheral portions spaced apart between said opposed surfaces and having marginal edges free from positive connection to each other, other portions of said plates being relatively thin, whereby said thick portions may be axially flexed independently into contact with said opposed surfaces, deformable means extending between said plates adjacent said edge portions to seal the space between said plates against escape of fluid pressure, and means for introducing fluid under pressure into said space.

8. A clutch comprising coaxially rotatable driving and driven members, one of said members including means providing axially spaced and opposed surfaces, the other of said members including a pair of radially extending plates having thick peripheral edge portions between said opposed surfaces, other portions of said plates being relatively thin, whereby said thick portions may be axially flexed into contact with said opposed surfaces, the said edge portions being provided with radially spaced opposed peripheral surfaces, a toric ring of deformable material between said opposed peripheral surfaces providing a seal to prevent escape of fluid pressure from the space between said plates while permitting relative axial movement of said edge portions, and means for introducing fluid under pressure into said space.

9. A clutch comprising coaxially rotatable driving and driven members, one of said members including means providing axially spaced and opposed surfaces, the other of said members including a pair of radially extending plates having thick peripheral edge portions between said opposed surfaces, other portions of said plates being relatively thin, whereby said thick portions may be axially flexed into contact with said opposed surfaces, the said edge portions being provided with radially spaced opposed peripheral surfaces, a toric ring of deformable material between said opposed peripheral surfaces providing a seal to prevent escape of fluid pressure from the space between said plates while permitting relative axial movement of said edge portions, stop means extending from one of said peripheral surfaces to retain said toric ring between said peripheral surfaces against the action of fluid pressure between said plates, and means for introducing fluid under pressure into said space.

10. A clutch comprising coaxially rotatable driving and driven members, one of said members including means providing axially spaced and opposed surfaces, the other of said members including a pair of radially extending plates having thick peripheral edge portions between said opposed surfaces, other portions of said plates being relatively thin, whereby said thick portions may be axially flexed into contact with said opposed surfaces, one of said edge portions terminating in a cylindrical peripheral surface, the other of said edge portions having a cylindrical flange radially aligned with but spaced from said cylindrical surface, a torus of deformable material in the space between said flange and said cylindrical surface, said torus being slightly compressed therebetween to seal the space between said plates against escape of fluid pressure while permitting relative axial movement between said cylindrical surface and said flange by rolling therebetween, and means for admitting a fluid under pressure to the space between said plates.

11. A clutch as defined in claim 6 wherein said cylindrical flange terminates in a portion extending radially toward said cylindrical surface to act as a retainer for said torus.

12. A clutch comprising coaxially rotatable driving and driven members, one of said members including means providing axially spaced and opposed surfaces, the other of said members including a pair of radially extending non-metallic, flexible plates having thick peripheral edge portions between said opposed surfaces, other portions of said plates being relatively thin, whereby said thick portions may be axially flexed into contact with said opposed surfaces, a pair of flexible, non-metallic diaphragms between said plates, each of said diaphragms being attached to its adjacent plate in fluid-tight relationship and extending to said edge portions, means joining said diaphragms adjacent said edge portions to seal the space between said plates against escape of fluid pressure, and means for introducing fluid under pressure into said space.

13. A clutch comprising coaxially rotatable driving and driven members, one of said members including means providing axially spaced and opposed surfaces, the other of said members including a pair of radially extending non-metallic, flexible plates having thick peripheral edge portions between said opposed surfaces, other portions of said plates being relatively thin, whereby said thick portions may be axially flexed into contact with said opposed surfaces, a pair of flexible diaphragms between said plates, means clamping portions of said plates together with said diaphragms therebetween to effect a fluid pressure seal between said diaphragms, means effecting a fluid pressure seal between said diaphragms adjacent said peripheral edge portions whereby to provide an expansible pressure chamber between said plates, and means for introducing fluid under pressure into said space.

14. A clutch comprising coaxially rotatable driving and driven members, one of said members having means providing a pair of relatively fixed opposed annular surfaces, said other member including a hub portion and a pair of axially spaced plates rigidly attached to said hub portion, said plates having thick annular outer portions spaced apart between said opposed surfaces and relatively thin flexible annular portions between said outer portions and said hub, said outer portions being free of positive connection to each other at the outer edges thereof, means extending between said outer portions to prevent escape of fluid pressure from the space between said plates while providing for free movement of said outer portions independently of hindrance by the other, and means to admit fluid under pressure to said space to axially flex said outer portions into engagement with said opposed surfaces and thereby effect driving engagement between said members.

15. A clutch comprising coaxially rotatable driving and driven members, one of said members having means providing a pair of relatively fixed opposed annular surfaces, said other member including a hub portion and a pair of axially spaced plates rigidly attached to said hub portion, said plates having thick annular outer portions between said opposed surfaces and relatively thin flexible annular portions between said outer portions and said hub, said outer portions being relatively movable axially and provided with radially opposed cylindrical surfaces, a deformable torus compressed between said cylindrical surfaces to prevent escape of fluid pressure from the space between said plates, and means to admit fluid under pressure to said space to axially flex said outer portions into engagement with said opposed surfaces and thereby effect driving engagement between said members.

16. A clutch comprising coaxially rotatable driving and driven members, one of said members having means providing a pair of relatively fixed opposed annular surfaces, said other member including a hub portion and a pair of axially spaced non-metallic plates rigidly attached to said hub portion, said plates having thick annular outer portions between said opposed surfaces and relatively thin flexible annular spaced apart portions between said outer portions and said hub, a pair of annular flexible diaphragms in the space between said plates, each diaphragm at its inner edge engaging one of said plates in fluid-sealing relation thereto and extending outwardly to the outer edges of said plates, means joining the outer edges of said diaphragms to effect a fluid seal therebetween, and means to admit fluid under pressure to said space to axially flex said outer portions into engagement with said opposed surfaces and thereby effect driving engagement between said members.

17. A structure of the class described, comprising: a first rotatable member and a second member arranged coaxially thereto, one of said members including means providing a pair of spaced opposed surfaces, the other of said members including a pair of substantially parallel flexible, non-metallic plates, spaced apart at least in the region of said opposed surfaces and extending between said opposed surfaces to provide a pressure chamber therebetween, the radially inner edges of said plates being positively secured together, the portions of said plates at the outer edges thereof being free from positive connection to each other, whereby the outer portions of said plates can move independently of each other toward and away from said opposed surfaces; and deformable, non-metallic, sealing means disposed between said plates and cooperable therewith to convert the space between said plates into a pressure chamber for operating fluid, said sealing means extending beyond the outer periphery of at least one of said plates; and means for introducing fluid under pressure into said space.

HARLAND W. CARDWELL.
EARL R. JOHNSON.

REFERENCES CITED

The following references are of record in the file of this patent:

UNITED STATES PATENTS

| Number | Name | Date |
|---|---|---|
| 427,085 | Jones | May 6, 1890 |
| 1,048,299 | Dickson | Dec. 24, 1912 |
| 1,578,815 | Dickson | Mar. 30, 1926 |
| 2,183,761 | Aspinwall et al. | Dec. 19, 1939 |
| 2,267,650 | Hale | Dec. 23, 1941 |
| 2,307,456 | Fawick | Jan. 5, 1943 |
| 2,381,941 | Wellman et al. | Aug. 14, 1945 |
| 2,446,694 | Dickson | Aug. 10, 1948 |
| 2,467,830 | Hornbostel | Apr. 19, 1949 |

FOREIGN PATENTS

| Number | Country | Date |
|---|---|---|
| 372,825 | France | Apr. 19, 1907 |